(12) United States Patent
Ballhatchet et al.

(10) Patent No.: US 11,797,247 B2
(45) Date of Patent: Oct. 24, 2023

(54) INTERACTIVE APPARATUS TO PRODUCE OUTPUT IN ASSOCIATION WITH MEDIA

(71) Applicant: YOTO Limited, London (GB)

(72) Inventors: Thomas Ballhatchet, Greater London (GB); Filip Denker, Greater London (GB); Benjamin Drury, Greater London (GB); Paul Smith, Hertfordshire (GB)

(73) Assignee: Yoto Limited, London (GB)

( * ) Notice: Subject to any disclaimer, the term of this patent is extended or adjusted under 35 U.S.C. 154(b) by 0 days.

(21) Appl. No.: 17/274,166

(22) PCT Filed: Jul. 10, 2020

(86) PCT No.: PCT/GB2020/051674
§ 371 (c)(1),
(2) Date: Mar. 5, 2021

(87) PCT Pub. No.: WO2021/014122
PCT Pub. Date: Jan. 28, 2021

(65) Prior Publication Data
US 2021/0286577 A1    Sep. 16, 2021

(30) Foreign Application Priority Data

Jul. 24, 2019    (GB) ...................... 1910552

(51) Int. Cl.
*G06F 3/14*        (2006.01)
*G01D 21/02*    (2006.01)
(Continued)

(52) U.S. Cl.
CPC ............... *G06F 3/14* (2013.01); *G01D 21/02* (2013.01); *G06F 1/1626* (2013.01);
(Continued)

(58) Field of Classification Search
CPC ..... A63F 13/90; A63F 13/95; A63H 2200/00; A63H 33/22; A63H 5/00; G01D 21/02;
(Continued)

(56) References Cited

U.S. PATENT DOCUMENTS 6,171,168 B1    1/2001    Jessop
7,261,612 B1    8/2007    Hannigan et al.
(Continued)

FOREIGN PATENT DOCUMENTS

CN    109675326 A    4/2019
DE    102011056420 A1    6/2013
(Continued)

OTHER PUBLICATIONS

International Search Report and Written Opinion corresponding to International Application No. PCT/GB2020/051674, dated Oct. 9, 2020 (13 pages).
(Continued)

*Primary Examiner* — Chun-Nan Lin
(74) *Attorney, Agent, or Firm* — Procopio, Cory, Hargreaves & Savitch LLP (57) ABSTRACT

An interactive apparatus including a housing, at least one input device, and a control device. The housing includes a light source, a speaker, a front face including a display screen, a rear face configured to permit light from the light source to pass, and a bottom face. The control device is configured for receiving media and controlling one or more of the light source, speaker and display screen to produce output in association with the media. The apparatus is configured to be stood on a surface in a first mode in which the bottom face rests on the surface such that the display screen is directed in a first direction, and a second mode defined by the front face resting on the surface, and for which the control device is configured to dim, or turn off, the (Continued)

display screen each time the apparatus is placed in the second mode.

22 Claims, 9 Drawing Sheets

(51) Int. Cl.
| | |
|---|---|
| *G06F 1/16* | (2006.01) |
| *G06F 1/3234* | (2019.01) |
| *G06F 1/3287* | (2019.01) |
| *G06F 3/02* | (2006.01) |
| *G06F 3/0362* | (2013.01) |
| *A63H 5/00* | (2006.01) |
| *A63H 33/22* | (2006.01) |

(52) U.S. Cl.
CPC .......... *G06F 1/1694* (2013.01); *G06F 1/3265* (2013.01); *G06F 1/3287* (2013.01); *G06F 3/0202* (2013.01); *G06F 3/0362* (2013.01); *A63H 5/00* (2013.01); *A63H 33/22* (2013.01); *A63H 2200/00* (2013.01)

(58) Field of Classification Search
CPC .... G06F 1/1626; G06F 1/1694; G06F 1/3206; G06F 1/3265; G06F 1/3287; G06F 2200/1637; G06F 3/0202; G06F 3/0362; G06F 3/14; Y02D 10/00
See application file for complete search history.

(56) References Cited

U.S. PATENT DOCUMENTS

| | | | | |
|---|---|---|---|---|
| 8,515,092 | B2* | 8/2013 | Rucker | A63H 3/28 446/175 |
| 10,286,333 | B2 | 5/2019 | Fassbender et al. | |
| 10,960,320 | B2 | 3/2021 | Fassbender et al. | |
| 2006/0003664 | A1 | 1/2006 | Yeh | |
| 2006/0174150 | A1* | 8/2006 | Nakano | G06F 3/0634 713/330 |
| 2010/0041308 | A1* | 2/2010 | Kumegawa | A63H 19/20 446/438 |
| 2010/0160054 | A1 | 6/2010 | Henry | |
| 2012/0046102 | A1 | 2/2012 | Tully | |
| 2013/0055001 | A1* | 2/2013 | Jeong | H04W 52/0254 713/323 |
| 2013/0059284 | A1 | 3/2013 | Giedgowd, Jr. et al. | |
| 2015/0229849 | A1* | 8/2015 | Shin | H04N 5/232933 348/207.1 |
| 2015/0290545 | A1* | 10/2015 | Barney | A63F 13/21 463/31 |
| 2016/0012624 | A1* | 1/2016 | Taki | G06T 11/60 345/634 |
| 2016/0306482 | A1* | 10/2016 | Gmyr | G06F 1/3265 |
| 2018/0272240 | A1 | 9/2018 | Soudek et al. | |
| 2018/0322533 | A1* | 11/2018 | Dehaven | G09F 9/35 |
| 2018/0353869 | A1* | 12/2018 | Corkin | A63H 5/00 |
| 2019/0022546 | A1* | 1/2019 | Fa Bender | H04W 4/80 |
| 2020/0249763 | A1* | 8/2020 | Moritani | G06F 1/1694 |
| 2020/0306618 | A1* | 10/2020 | Ziran | A63F 3/00643 |
| 2021/0255746 | A1* | 8/2021 | Hu | G06F 1/3228 |

FOREIGN PATENT DOCUMENTS

| | | |
|---|---|---|
| EP | 2363776 A1 | 9/2011 |
| WO | 2014147410 A1 | 9/2014 |

OTHER PUBLICATIONS

Teresa Denker., "10 reasons I want my children to grow up away from TV, computer and tablets", Oct. 31, 2017 (Oct. 31, 2017), Retrieved from the Internet: URL: "https://www.yotoplay.com/blogs/yoto-journal/10-reasons-i-want-my-children-to-grow-up-away-from-tv-computer-and-tablets", XP002800435, [retrieved on Sep. 23, 2020], whole document (6 pages).
Shivali Best, "Worried your child spends too much time in front of a screen? £130 'clever speaker' Yoto helps develop early skills using audio content", Oct. 31, 2017 (Oct. 31, 2017), Retrieved from the Internet: URL: "https://www.dailymail.co.uk/sciencetech/article-5036131/Clever-speaker-helps-develop-skills-using-audio.html", XP002800436, retrieved on Sep. 23, 2020], whole document (7 pages).
Szcys, Mike, "Audiobook Player Used Only NFC Tags for Control", URL: https://www.Hackday.com, Mar. 4, 2013 including comments and YouTube Video "Zero Button Audiobook Player", URL: https://www.youtube.com/watch?v=PfXmEMPt9ws&t=1s, Mar. 3, 2013. (11 pages).
Szcys, M., "One-Button Audiobook Player Made From a Raspberry PI", URL: https://www.Hackday.com, including comments, Nov. 1, 2012.
Skål, "Playful Research Tangible Interface", http://old.react-hub.org.uk/objects-sandbos/skal/, 2007.
Pontes Lara et al, "Security in Smart Toys: A Systematic Review of Literature", Jun. 7, 2019 (Jun. 7, 2019), Robocup 2008: Robocup 2008: Robot Soccer World Cup XII; [Lecture Notes in Computer Science; Lect.Notes Computer], Springer International Publishing, CHAM, pp. 28-38, XP047513092, ISBN: 9783319104034, the whole document (12 pages).
Rivera Diego et al, "Secure Communications and Protected Data for a Internet of Things Smart Toy Platform", IEEE Internet of Things Journal, IEEE, USA,vol. 6, No. 2, Apr. 1, 2019 (Apr. 1, 2019), p. 3785-3795, XP011723714.
Kshetri Nir et al, "Cyberthreats under the Bed", May 1, 2018 (May 1, 2018), vol. 51, No. 5, URL: https://doi.org/10.1109/MC.2018.2381121, the whole document (6 pages).
Muuselabs, 2018, 'Jooki—Music and Story Player for Kids, MP3 Spotify, Wifi Bluetooth, portable boombox speaker, musical toys gift for toddlers children, 2 3 4 5 6 7 years old, storytelling educational', Amazon UK, [online], Available from: https://www.amazon.co.uk/Jooki-Screen-Free-Stories-ToyTouch-Technology/dp/B07FGG5H4X. See whole page.
Great Britain Search Report corresponding to Great Britain Application No. GB1910552.7, dated Apr. 9, 2021 (1 page).
Great Britain Search Report corresponding to Great Britain Application No. GB1910552.7, dated Dec. 3, 2019 (4 pages).
Great Britain Search Report corresponding to Great Britain Application No. GB2116354.8 dated Feb. 24, 2022 (1 page).
China Office Action corresponding to China Application No. 202010534437.9, dated Jun. 14, 2023, English Translation (20 pages).
"Yoto card reading robot, decorate custom cards with stickers", wechat public account Greek Dad Subscription number, Geek Dad, machine translated, (Jan. 21, 2018) Jan. 21, 2018 (16 pages).

* cited by examiner

INTERACTIVE APPARATUS TO PRODUCE OUTPUT IN ASSOCIATION WITH MEDIA

CROSS REFERENCE TO RELATED APPLICATION(S)

This application is a National Stage Application filed under 35 U.S.C. § 371 of PCT International Patent Application Serial No. PCT/GB2020/051674, entitled "An interactive apparatus", and filed on Jul. 7, 2020, which claims the benefit of Application No. 1910552.7, entitled "An interactive apparatus", and filed on Jul. 24, 2019, each of which is expressly incorporated by reference herein in its entirety.

This invention relates to an interactive apparatus.

Interactive apparatus are known for interaction by a user to engage with media including images, video and audio. Interactive apparatus are also known which have communication interfaces to permit wireless control of the apparatus, and/or transmission of multimedia content to the apparatus.

More recently, interactive apparatus configured as toys for children have become available. An attraction of such interactive apparatus is that they permit an active engagement of a child with media to create a play activity as opposed to a passive engagement such as a child simply watching a video or the like. Such apparatus may include media being stored on physical objects configured as cards, and figurines which include wireless communication tags such as NFC and/or RFID that can be read by the apparatus to play the media. A child may thus operate the apparatus to engage with the media to curate their own experiences. Such an apparatus may include a communication interface for communication with computing equipment over a communication network, e.g. Bluetooth and the internet, to permit the transfer of media and/or control of the apparatus, e.g. to stream multimedia content to the apparatus. For such an apparatus, the media may not be stored on the physical objects but instead the physical objects may have media identifier keys, e.g. URL addresses, for downloading an associated media to the apparatus. Apparatus may include communication devices such as microphones and cameras to permit a child to transmit, receive and/or record audio/video content through the apparatus. This increases the creativity of the apparatus and stimulates further interaction opportunities for a child.

It is desirable for such apparatus to provide an authentic play experience for a child with multiple modes of play to further enhance the variety of play experiences available to the child and/or provide further functionality.

The present invention seeks to provide an improved interactive apparatus with respect to the prior art interactive apparatus.

According to an aspect of the present invention we provide an interactive apparatus, the apparatus including:
a housing including:
  a light source;
  a speaker;
  a front face including a display screen;
  a rear face configured to permit light from the light source to pass therethrough or therefrom;
  a bottom face;
input device(s) for providing input(s);
a control device for controlling the interactive apparatus, wherein the control device is configured for receiving media and controlling one or more of the light source, speaker and display screen to produce output(s) in association with the media;
wherein the apparatus, during use, may be stood on a surface in:
  a first mode in which the bottom face rests on the surface such that the display screen is directed in a first direction, and,
  a second mode defined by the front face resting on the surface, and for which the control device is configured to dim, or turn off, the display screen each time the apparatus is placed in the second mode.

The rear face may include a support portion which extends rearwardly and upwardly away from the bottom face so that the apparatus, during use, may be stood on the surface in:
  a further mode in which the support portion rests on the surface such that the display screen is directed in a second direction which is inclined with respect to the first direction.

According to an aspect of the present invention we provide an interactive apparatus, the apparatus including:
a housing including:
  a light source;
  a speaker;
  a front face including a display screen;
  a bottom face;
  a rear face including a support portion which extends rearwardly and upwardly away from the bottom face, and wherein the rear face is configured to permit light from the light source to pass therethrough or therefrom;
input device(s) for providing input(s); and a control device for controlling the interactive apparatus, wherein the control device is configured for receiving media and controlling one or more of the light source, speaker and display screen to produce output(s) in association with the media,
wherein the apparatus, during use, may be stood on a surface in:
  a first mode in which the bottom face rests on the surface such that the display screen is directed in a first direction, and,
  a further mode in which the support portion rests on the surface such that the display screen is directed in a second direction which is inclined with respect to the first direction.

The apparatus may be stood on a surface in:
a second mode defined by the front face resting on the surface, and for which the control device is configured to dim, or turn off, the display screen each time the apparatus is placed in the second mode.

The apparatus may include one or more sensors for detecting an orientation of the apparatus for use by the control device in determining when the apparatus is in its second mode, optionally or preferably the control device being configured to dim, or turn off, the display screen if the apparatus is determined to be in its second mode.

The one or more sensors may include a light sensor, accelerometer and/or a tilt switch.

The rear face may be configured to permit light from the light source to pass through or from the support portion.

The rear face may include a further portion connected to the support portion, and the further portion may extend forwardly and upwardly away from the support portion.

The rear face may be configured to permit light from the light source to pass through or from the further portion.

At least the support portion may include a raised part and a peripheral lower part which extends around the raised part, such that, when the apparatus is in the second mode, only the raised part rests on the surface.

The rear face may include an opaque section and a translucent or transparent section; optionally or preferably the translucent/transparent section extends around at least a periphery of the opaque section to permit light to pass therethrough; optionally or preferably the translucent/transparent section forms a ring which extends around the opaque section.

The raised part may include the opaque section and the peripheral lower part may include the translucent/transparent section.

The opaque section may extend across the support portion and/or further portion.

The housing may include:
a first housing part including the front face and bottom face, and
a second housing part, including the rear face, which is wedge-shaped.

The first housing part may be cuboidal-shaped.

The apparatus may be a portable apparatus.

The input device(s) may include a reading device for reading a media identifier key present on a media object when said media object is placed into close proximity to or physical contact with the interactive apparatus.

The control device may be configured to use the media identifier key to obtain an associated media and provide said associated media to the display screen, light source and/or speaker.

The associated media may be stored on a computer readable medium of the interactive apparatus and/or may be stored on a remote computer from which the associated media may be downloaded.

Embodiments of the invention will be set out below by way of example only with reference to the accompanying figures, of which.

Figure 1:
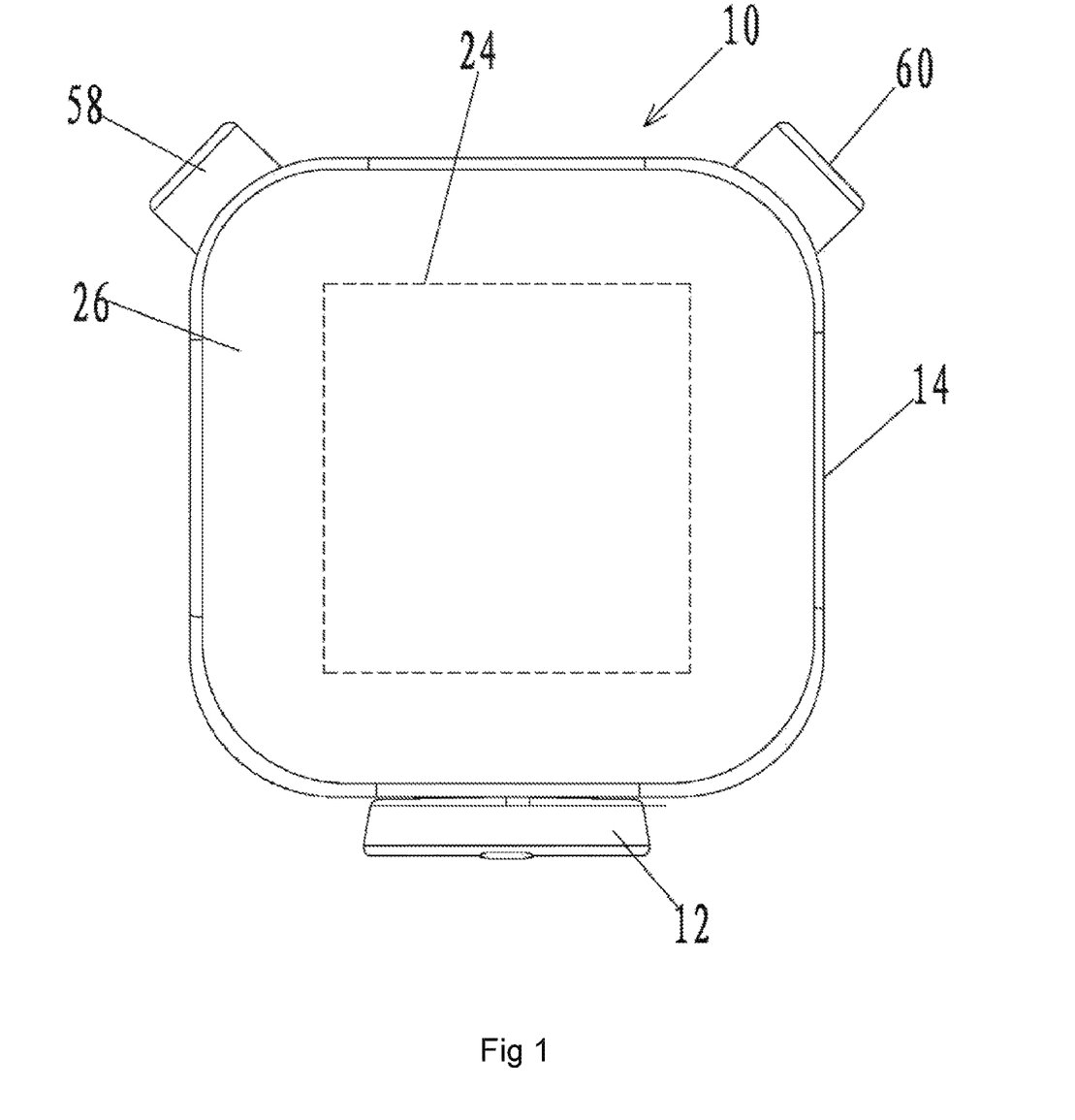
FIG. 1 is a front view of an interactive apparatus connected to a charging device in accordance with embodiments of the present invention.

With reference to the figures and FIG. 1 in particular, an interactive apparatus 10 connected to a charging device 12 in accordance with an embodiment of the present invention is shown. The interactive apparatus 10 is a portable device and includes a battery which may be recharged through connection of the interactive apparatus 10 to the charging device 12. The charging device 12 includes electric contacts for contacting corresponding electric contacts on the interactive apparatus 10 to complete a charging circuit thereof. In embodiments, the interactive apparatus may be configured as a smart speaker or a toy for a child. In the following description, one or more of the features may be employed in connection with such interactive apparatus in a way that will be readily appreciated by the skilled person.

With reference to the FIGS. 1 to 4, 7 and 8 in particular, the interactive apparatus 10 includes a housing 14 including a light source 16, speakers 18, input devices 20 for providing inputs, and a control device 22. The control device 22 is for controlling the interactive apparatus 10. The control device 22 is configured to receive media and control one or more of the light source 16, speakers 18 and display screen 24 to produce outputs in association with the media as will be described. The housing 14 may be made from a plastics material and/or acrylic materials in embodiments. The term "display screen" may denote a screen which is illuminated, or a display which includes a light source for illuminating a display screen.

The housing 14 has a front face 26 including the display screen 24, and a rear face 28 configured to permit light from the light source 16 to pass therethrough or therefrom, and a bottom face 30. The bottom face 30 includes a member 32 which sits proud of the rest of the bottom face 30. The member 32 is disc-shaped and positioned centrally of the bottom face 30 within a recess thereof. The rear face 28 includes a support portion 34 which extends rearwardly and upwardly away from the bottom face 30 (as viewed from the side when the interactive apparatus 10 rests on the bottom face 30—see FIG. 2). The front face 26 and rear face 28 are spaced apart along an axis A. The housing 14 includes a top face 31 which is spaced apart from the bottom face 30 along an axis B. Axis B may be perpendicular or transverse to axis A. The housing 14 includes opposing side faces 33, 35 which extend between respective sides of the bottom and top faces 30, 31. In embodiments, the housing 14 may have other shapes with differing configurations of faces. The term "face" denotes a directional aspect of a section of the housing 14. For example, the housing 14 may not have discrete side faces and, instead, have a spherical shape with a front face corresponding to the section or portion of the surface of the housing which includes the display screen, and a rear face corresponding to the section or portion of the surface of the housing positioned rearwardly of at least a portion of the front face 26.

Figure 5:
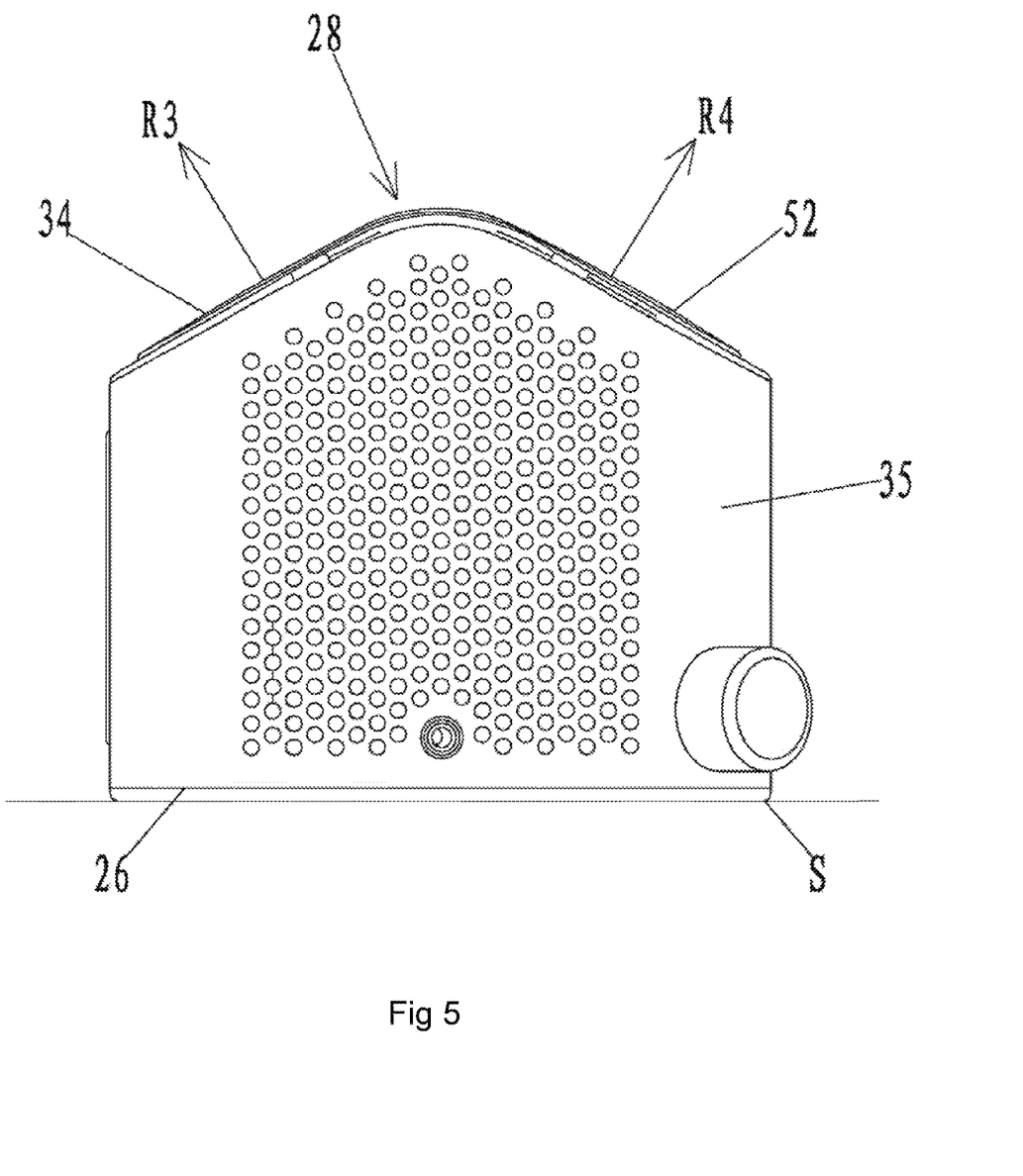
FIG. 5 is a side view of an interactive apparatus stood on a surface in a further mode in accordance with embodiments of the present invention.
Figure 6:
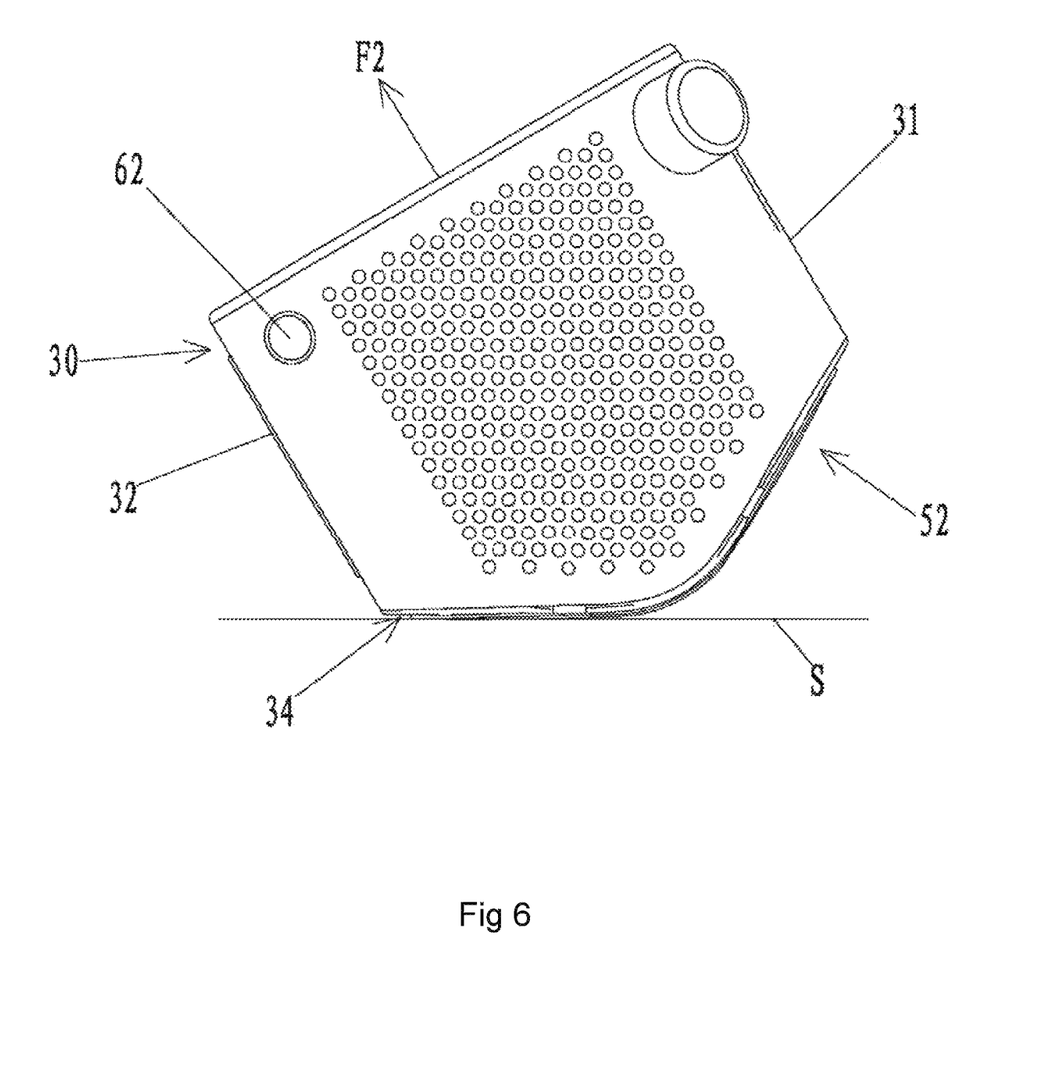
FIG. 6 is a side view of an interactive apparatus stood on a surface in a another mode in accordance with embodiments of the present invention.

As will be explained, and shown in FIGS. 2 and 3, the interactive apparatus 10, during use, may be stood on a surface S in a first mode, in which the bottom face 30 rests on the surface S such that the display screen 24 is directed in a first direction F1. As shown in FIG. 5, the interactive apparatus 10 may also be stood on the surface S in a second mode defined by the front face 26 resting on the surface S. The control device 22 is configured to dim, or turn off, the display screen 24 each time the interactive apparatus 10 is placed in the second mode. With reference to FIG. 6, the interactive apparatus 10 may also be stood on the surface S in a third mode, in which the support portion 34 rests on the surface such that the display screen 24 is directed in a second direction F2 which is inclined with respect to the first direction F1.

The housing 14 includes a first housing part 36 which is generally cuboidal-shaped and a second housing part 38, extending rearwardly away from the first housing part 14, which is generally wedge-shaped. The first and second housing parts 36, 38 are formed as an integral component part in embodiments but they may be formed differently in embodiments, e.g. as separate component parts connected together. In particular, the front face 26, bottom face 30, and top face 31 are respective faces of the first housing part 36 and the rear face 28 is a face of the second housing part 38. The side faces 33, 35 extend across both the first and second housing parts 36, 38.

The housing 14 defines an internal space 40 in which a number of components are located. The light source 16, first and second speakers 18 and control device 22 are located within the internal space defined by the housing 14.

In more detail, PCB 42 is positioned in space 40 near the front face 26. The PCB 42 has a front face and a rear face to which the various component parts are mounted.

The control device 22 is mounted on the rear face of the PCB 42. The control device 22 may be in the form of a processor and/or other control device configured to control the various components of the interactive apparatus 10. The interactive apparatus 10 may have a storage medium including instructions, e.g. software modules and code, for processing by the control device 22 to effect operation of the interactive apparatus 10. The interactive apparatus 10 may have a SD card device 44 for reading data from, and, storing data on, a SD card.

A battery 47 is mounted on the rear face of the PCB 42 at a bottom end thereof. An upper end of the PCB 42 includes first and second switch devices 45, 46 positioned towards respective corners of the PCB 42.

The front face of the PCB 42 includes LEDs 48 mounted thereon for directing light towards the display screen 24. The display screen 24 is attached to the front face 26. The display screen 24 may, in embodiments, permit light from the LEDs 48 to pass therethrough. For example, display screen 24 may be formed from a transparent material having an outer coating, e.g. paint, which is illuminated as light passes through the transparent material and strikes the outer coating. In embodiments, the display screen 24 may be formed by an In-Mould-Label (IML) process in which a thin plastic layer is moulded with a transparent plastic element. A mask (not shown) fits over the LEDs 48 so that each LED creates a square shaped illumination on the display screen 24. The LEDs 48 are arranged in a square shaped array so that each LED effectively represents a pixel of the display screen 24. The LEDs 48, for example, may be arranged in a 16×16 arrangement. Dimming or turning off of the display screen 24 is to be understood as referring to the LEDs being dimmed or turned off so that the display screen 24 is dimly illuminated or not illuminated at all.

The interactive apparatus 10 includes a sensor 25 for detecting the orientation of the apparatus 10. For example, sensor 25 may be a light sensor for detecting an ambient light level intensity at the front face 26 and the control device 22 is configured to dim, or turn off, the display screen 24 if the light level intensity is below a pre-determined level. In embodiments, the light sensor may be positioned on the front facing surface of the PCB 42, e.g. at a top left corner thereof in front view, to receive light from the front face 26. In embodiments, the light sensor may be positioned on the rear facing surface of the PCB 42, e.g. at a top right corner thereof as viewed in front view. The light sensor may receive light which enters through an aperture of the housing 14, e.g. a grille holes in one of the side walls 33, 35. Having the light sensor positioned on the rear facing surface of the PCB 42 may be advantageous as it avoids possible issues of misreading the ambient light levels due to the front facing surface of the PCB 42 receiving light which has been repeatedly reflected internally of the housing 14, e.g. within any transparent element of the display screen 24. In embodiments, there may be respective light sensors positioned on both the front and rear facing surfaces of the PCB 42. Readings from the light sensor(s) may be obtained to detect the ambient light levels and used to adjust automatically the intensity of the display screen 24 and/or light source 16 to an appropriate level in accordance with the ambient light levels. For example, in a darkened room, the intensity of the display screen 24 and/or light source 16 may be automatically lowered accordingly.

In embodiments, the interactive apparatus 10 the sensor 25 may be an accelerometer and/or a tilt switch to detect the orientation of the apparatus as will be explained. In embodiments, a combination of one or more of a light sensor, accelerometer and tilt switch may be employed to detect the orientation of the apparatus. For example, in embodiments for which the apparatus 10 includes a single light sensor mounted to the rear facing surface of the PCB 42, the use of the accelerometer and/or tilt switch may be required to detect the orientation of the apparatus.

The speakers 18 are mounted to a hollow frame 50 positioned in space 40. The frame 50 is generally the same shape as the housing 14. The frame 50 has front and rear faces which are open. The first and second ones of the speakers 18 are mounted to respective side faces of the frame 50 so as to be positioned adjacent side faces 33, 35. Side faces 33, 35 have respective grille apertures to permit sound from the speakers 18 to travel through the faces 33, 35.

The rear face 28 of the housing 14 includes a further portion 52 connected to the support portion 34. The further portion 52 extends forwardly and upwardly away from the support portion 34 before terminating at a rear side of the top face 31 (as viewed from the side when the interactive apparatus 10 rests on the bottom face 30—see FIG. 2). The support portion 34 and further portion 52 are each generally planar so as to form a V-shape in side view. The support portion 34 thus faces in a first direction R1, whilst the further portion 52 faces in second direction R2 which is inclined with respect to the first direction R1. In more detail, first direction R1 points downwardly and rearwardly of the interactive apparatus 10 as viewed from the side when the interactive apparatus 10 rests on the bottom face 30. Second direction R2 points upwardly and rearwardly of the interactive apparatus 10 as viewed from the side when the interactive apparatus 10 rests on the bottom face 30.

Figure 7:
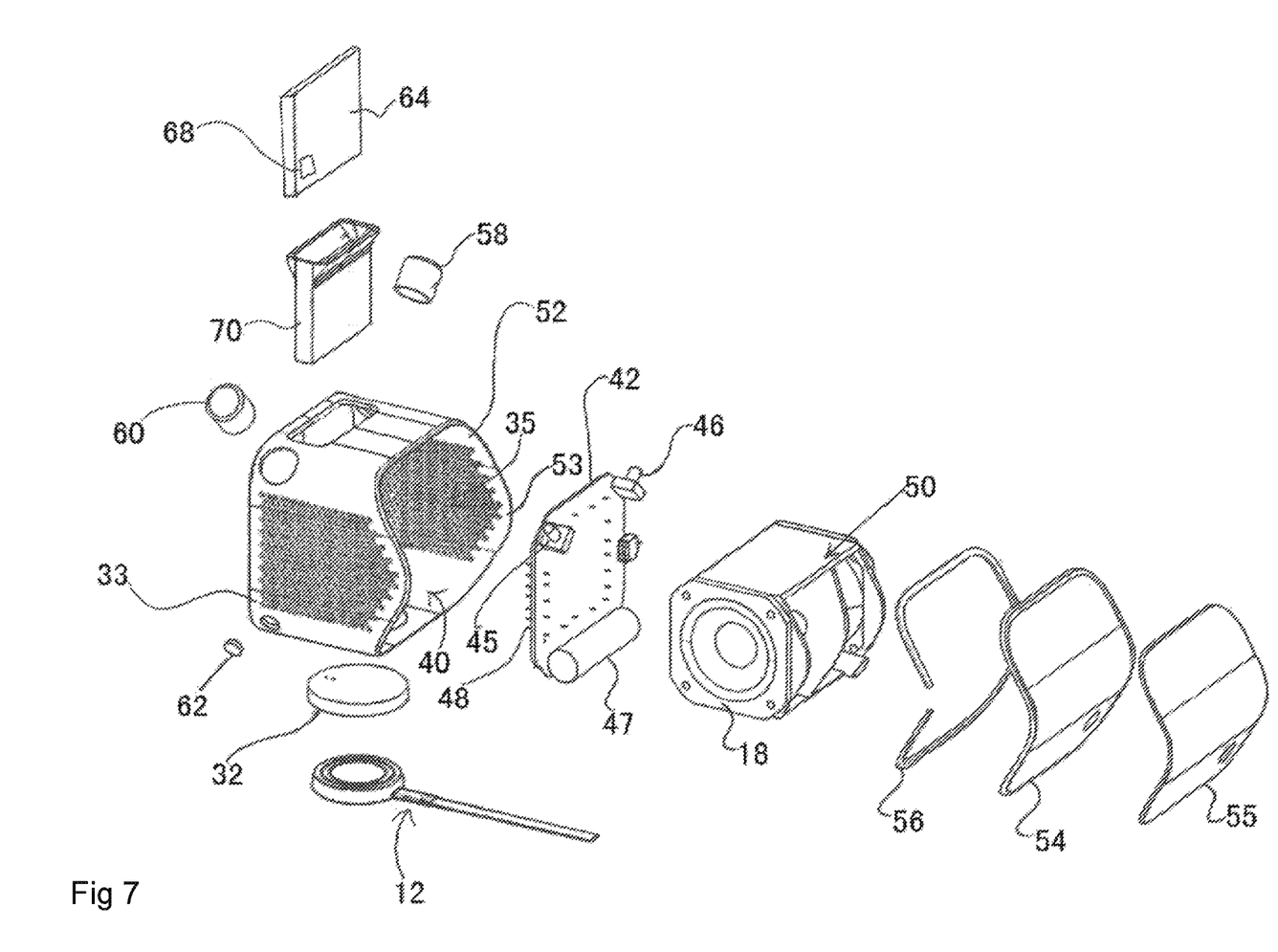
FIG. 7 is an exploded view of an interactive apparatus and charging device in accordance with embodiments of the present invention.
Figure 8:
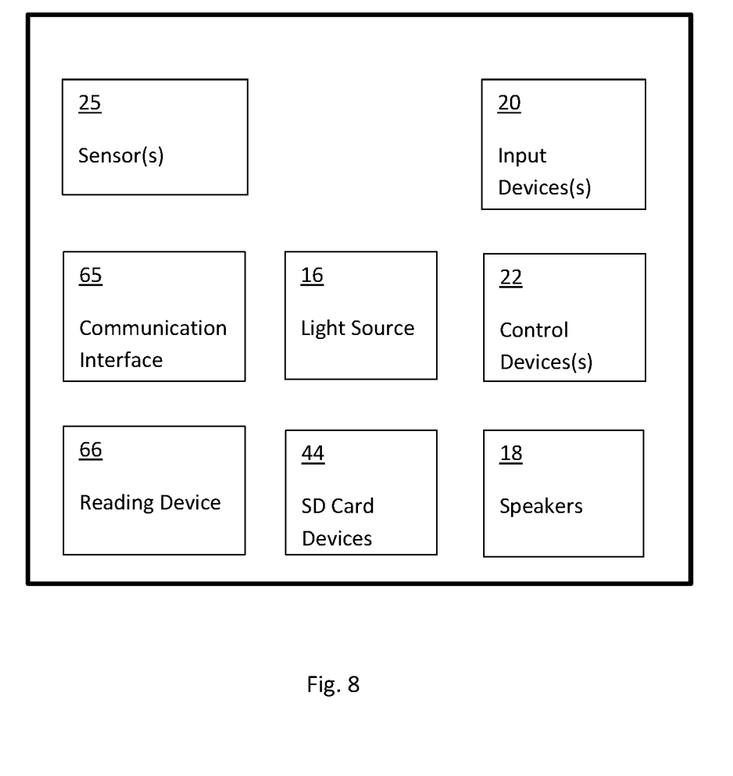
FIG. 8 is a schematic drawing of an interactive apparatus in accordance with embodiments of the present invention.

With reference to FIG. 7, the rear face 28 includes an opening 53 defined by the housing 14 which extends along the support and further portions 34, 52. Light source 16 may be formed as a series of LEDs provided on a PCB ring 56 which is mounted within opening 53 at the rear face 28 of the housing 14. Mounted to the housing 14, within the opening 53, are a translucent or transparent member 54 and an opaque member 55. The member 54 is a cover which is shaped to match the shape of the rear face 28 and extends across the entire opening 53 thereof. The member 54 also serves to physically attach the PCB ring to the housing 14. The opaque member 55 is positioned centrally of the member 54 so that they are contiguous. Member 55 sits proud of the member 54 and the rest of the rear face 28. Members 54, 55, 56 are each of the same profile, i.e. each member is generally V-shaped so as to follow the shape of the support and further portions 34, 52 as the members 54, 55, 56 each extend over them. The member 54 forms a peripheral section 57 which extends around a periphery of the opaque member 55 to form a ring around the opaque member 55. The rear face 28 thus includes an opaque section and a translucent (or transparent in embodiments) section which extends around a periphery of the opaque section.

The member 55, in embodiments, is thus configured to sit proud of the member 54 so as to form a raised part with respect to the rest of the support and further portions 34, 52. A peripheral lower part, corresponding to the peripheral section 57 of the member 54, thus extends around the raised part, such that, when the apparatus 10 is in the third mode (see FIG. 6), only the raised part rests on the surface S. The member 55 is formed from a rubber material so that there is a frictional contact with the surface S in the third mode to inhibit slipping of the interactive apparatus 10 on the surface S during use.

In the described configuration, during use, the light source 16 will illuminate the member 54, whilst the member 55 will block the transmission of light so that only light from the peripheral section 57 of the member 54 is transmitted outwardly from the rear face 28 to the ambient environment. It will be appreciated that for embodiments in which the rear face 28 has a support portion 34 and further portion 52, light will be transmitted to the environment through respective peripheral sections in different directions defined by the respective surfaces of the portions 34, 52.

Input devices 20 may include user operable buttons, a touch screen or other user operable devices for providing user inputs to the interactive apparatus 10 to interact with, and/or provide user commands, to the interactive apparatus 10. The user inputs may be for turning the apparatus 10 on and off, adjusting the properties of the light source 16, speakers 18 and display screen 24, e.g. volume, display settings, and controlling the apparatus 10 to process media as will be described. In embodiments, the input devices 20 may include portable devices that are connectable via a wired or wireless connection to the interactive apparatus 10. Such input devices 20 may include cellular telephones, computer tablets or computers.

Input devices 20 include first and second knobs 58, 60 provided at respective openings in the front left and right corners of the first housing part 36. The first and second knobs 58, 60 extend through the openings in the first housing part 36 to be operatively connected to the switch devices 45, 46 such that rotation and/or depression of the knobs effects corresponding operation of the switch devices 45, 46 to provide inputs to the control device 22 to operate the interactive apparatus 10 accordingly, e.g. increase volume and/or interact with the media.

Input devices 20 include a button 62 provided in an opening in the side face 33 and which is operatively connected to the PCB 42. The button 62 may be pressed by a user to turn the light source 16 on or off during use.

The input devices 20 may be operated to cause the interactive apparatus 10 to receive media via a media object 64, associate media to the media object 64, and/or permit user interaction/engagement with said media. Media object 64 may be a physical object in the form of a card, figurine or the like, when the interactive apparatus 10 is configured as a toy. The media object 64 may include a wireless communication device to permit communication between the media object 64 and the interactive apparatus 10. The control device 22 may be configured for receiving media and providing the media to the light source 16, speakers 18 and/or display screen 24 to provide audio and/or visual outputs associated with the media, e.g. generate sounds and visual images on a user operating the input devices 20.

In embodiments, the interactive apparatus 10 may include a communication interface 65 for communication with electronic/computer devices (e.g. a computer, cellular/smart phone, tablet and the like) over a communications network, e.g. a wireless network, the internet or wireless communication protocols such as Bluetooth. The communication interface may be an on-board device.

Input devices 20 may include a reading device 66 for reading the media object 64 when the media object 64 is placed in close proximity to or physical contact with the interactive apparatus 10. Reading device 66 may include a wireless communication reader and media object 64 may include a wireless communication tag. In embodiments, the tag may include media, e.g. audio and visual content in a coded format, and which media can be read by the reading device 66 and converted by the control device 22 into audio and/or visual outputs for outputting by the light source 16, speakers 18 and/or display screen 24. In embodiments, the tag may include a media identifier key 68. The media identifier key 68 may be used by the control device 22 to obtain an associated media. In embodiments, the media identifier key 68 may be in the form of a URL which can be read by the reading device 66 and provided to the control device 22 for downloading/streaming the associated media from a remote computer, e.g. a server in the cloud. In embodiments, the media identifier key 68 may be used by the control device 22 to obtain an associated media stored at the interactive apparatus 10. Examples of wireless communication tags include passive and active Near Field Communication tags (NFC Tag) and/or a Radio Frequency Identification tags (RFID tag). Examples of media may include an audio book or music which may be played by the interactive apparatus 10, graphics/animations for display by the interactive apparatus 10, and/or a combination of graphics/animation/audio and light that is produced by the interactive apparatus 10 in response to user inputs at the interactive apparatus 10. The interactive apparatus 10 may include a receiving device 70 supported by the housing 14 for receiving the media object 64 to effect reading of, and/or transfer of data with, the media object 64. The receiving device 70 may be in the form of a generally rectangular hollow housing with an open top face, to permit insert of the media object 64 into the receiving device 70, which sits flush with the top face 31 of the housing 14. For example, the receiving device 70 is sufficiently close and/or in contact with the reading device 66 to ensure that the media object 64 may be read, e.g. due to the range of the wireless communication tag where it is employed for embodiments.

Operation of the interactive apparatus 10 will now be described.

Figure 2:
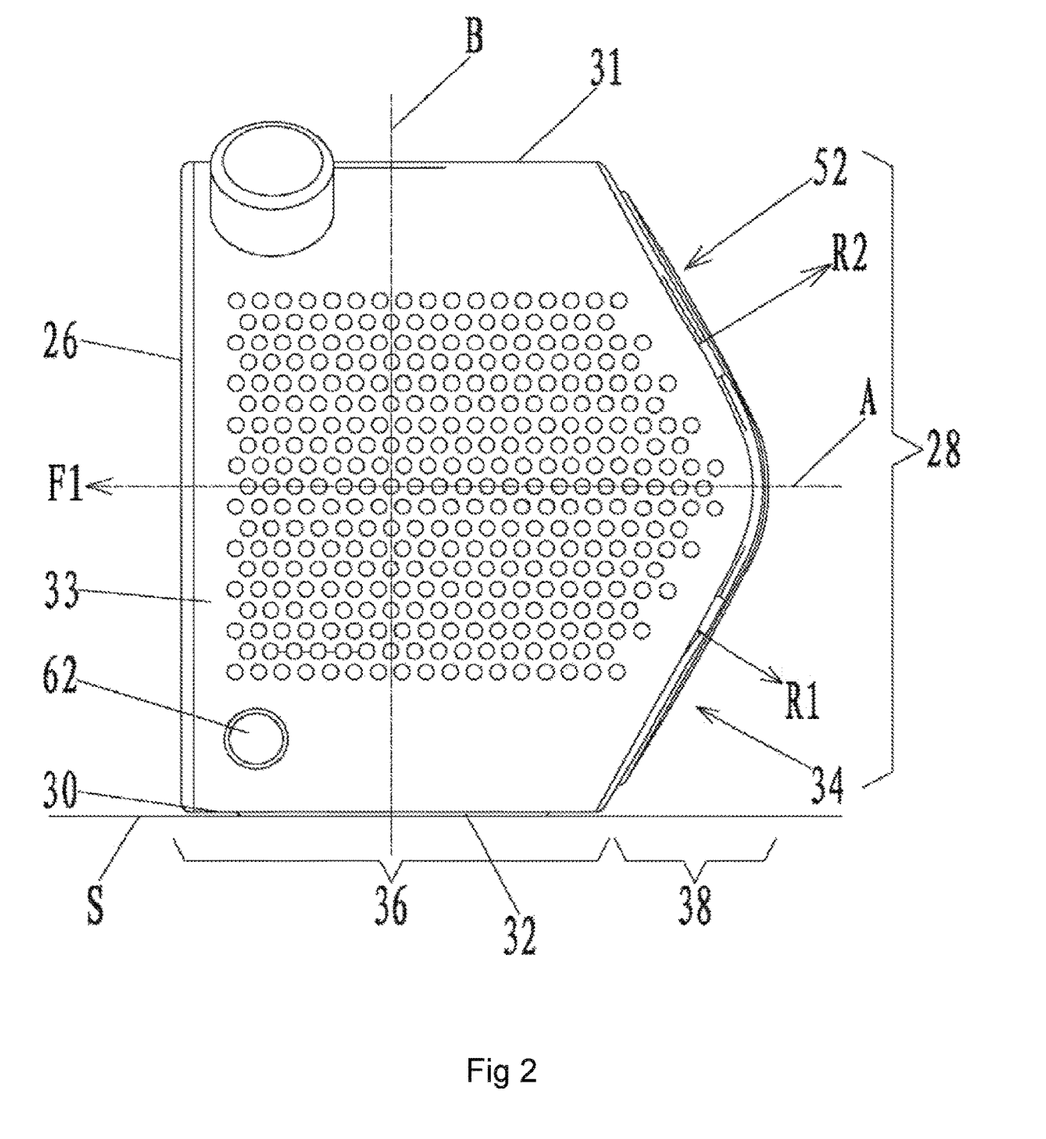
FIG. 2 is a side view of an interactive apparatus stood on a surface in a mode in accordance with embodiments of the present invention.
Figure 3:
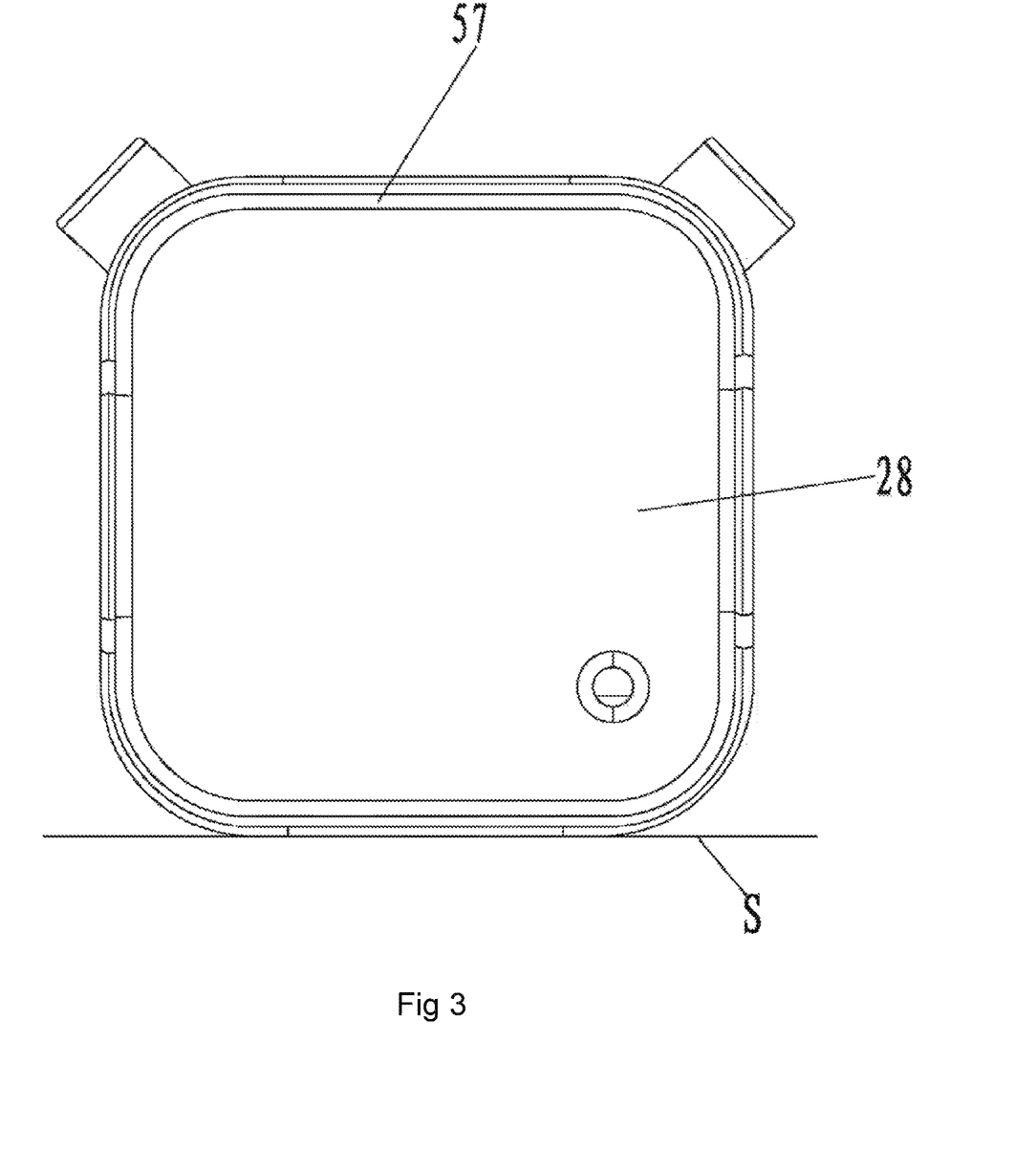
FIG. 3 is a rear view of an interactive apparatus stood on a surface in the mode of FIG. 2 in accordance with embodiments of the present invention.
Figure 4:
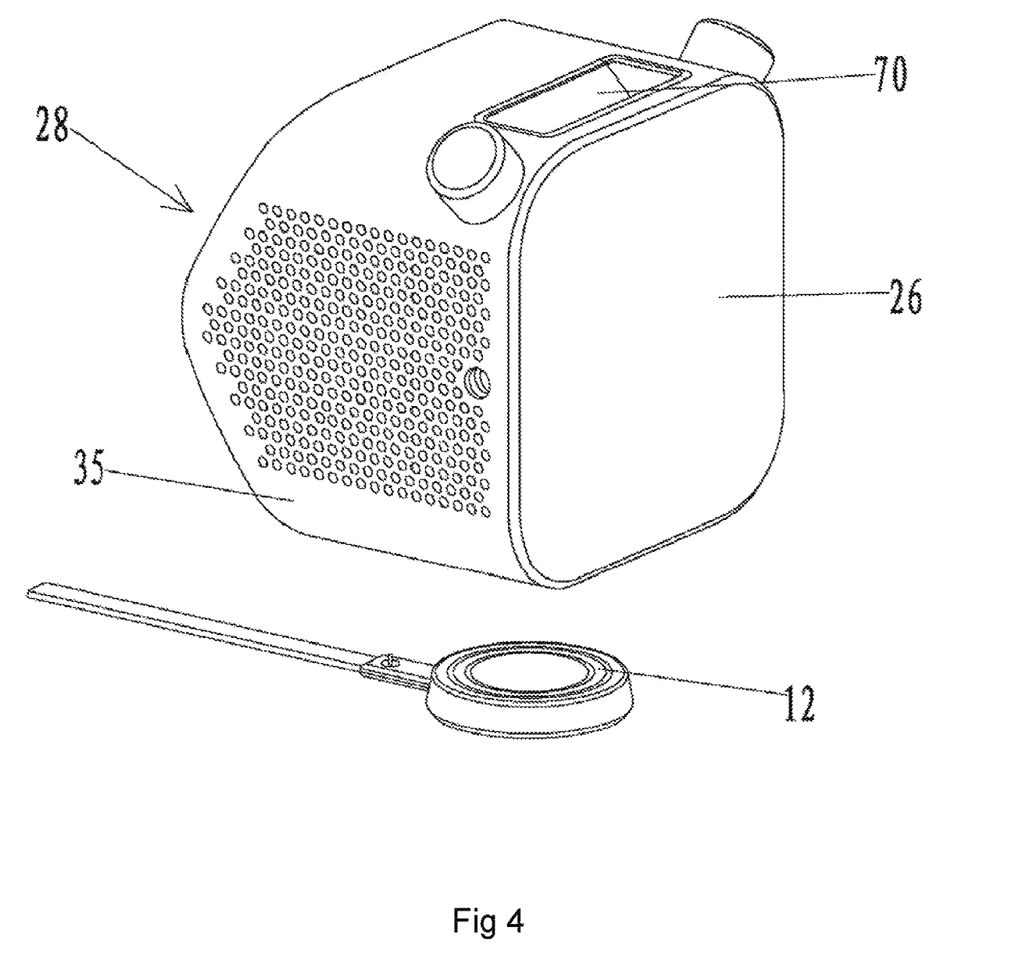
FIG. 4 is a perspective view of an interactive apparatus shown raised with respect to a charging device in accordance with embodiments of the present invention.

The user may place the interactive apparatus 10 into its first mode of operation by standing the interactive apparatus 10 on its bottom face 30 on the surface S as shown in FIG. 2. The surface S may correspond to an upwardly facing surface of a table or the like so that the user may interact with the interactive apparatus 10 whilst being seated or standing near the table. In this first mode of operation, the display screen 24 is thus directed in a first direction F1 which is generally horizontal or parallel with the plane in which the surface S lies.

The user may turn on the interactive apparatus 10 by operating one of the input devices 20, e.g. pressing a user operable button thereof, or placing the media object 64 in the receiving device 70 which is then read by the reading device 66 to cause the interactive apparatus 10 to turn on. The control device 22 then performs the associated operations/instructions to bring the interactive apparatus 10 into a ready state for operation by the user. The placement of the media object 64 in the receiving device 70 (if not placed already), causes the reading device 66 to scan the media object 64 via the object's associated wireless communication tag. The control device 22 may then obtain the media identifier key 68. The control device 22 checks whether or not the associated media has previously been accessed, and/or whether the associated media is only permitted for streaming. The first of these may be done by the control device 22 comparing metadata and/or filenames of the associated media against media stored on a SD card in the SD card device 44.

Figure 9:
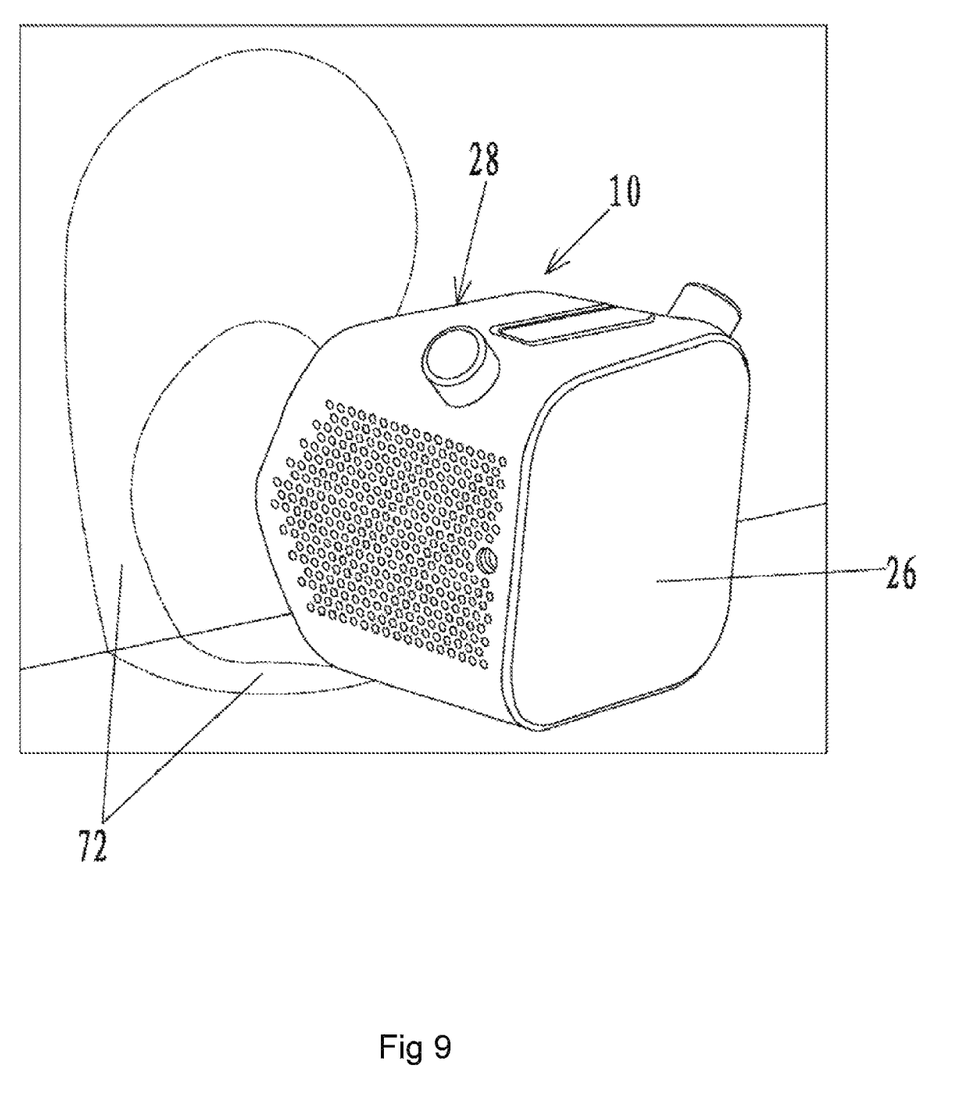
FIG. 9 is a perspective view of an interactive apparatus during use in accordance with embodiments of the present invention.

Assuming the associated media has already been accessed and so is stored on the SD card device 44, the control device 22 obtains the associated media from the SD card device 44. The user may then interact with the media by operating input devices 20. The control device 22 may then accordingly process the media and provide the same as signals for the light source 16, speakers 18 and display screen 24 to output audio, images, animation, graphics, light and the like associated with the media. In particular, during operation, the light source 16 may illuminate the peripheral sections of the support portion 34 and further portion 52 to emit light to the ambient environment in the first direction R1 and second direction R2 respectively. Due to the peripheral section 57 forming a thin ring, the light forms a ring pattern on the surface S and any other surrounding surfaces on which the light is incident. For example, with reference to FIG. 9, if the interactive apparatus 10 is placed near a wall, a ring shape 72 is formed which bridges the surface S and the surface of the wall. The rear face 28 thus illuminates a surface on which the interactive apparatus 10 rests and also the space to the rear of the interactive apparatus 10. This creates a playful projection of light that can be pleasing to the user. The light can produce an ambient light effect for the user, particularly if the interactive apparatus 10 is being used in an environment having relatively low ambient light.

The illumination may vary in colour and intensity in accordance with the media, e.g. if the music has a fast pace, the light source 16 may quickly alternate between high and low intensities, or if the media is an audio book with a quietly spoken piece of prose, the light source 16 may lower in intensity accordingly. This enhances the user experience as it adds a further mode of simulation of the user in a way which deepens the user's engagement with the media.

The user may also use the interactive apparatus 10 in the first mode as a lamp, e.g. a bedside lamp, by simply pressing the button 62 to turn the light source 16 on. The user may increase or decrease the intensity of the light emitted by the rear face 28 by operating the input devices 20.

The user may place the interactive apparatus 10 into its third mode of operation by standing the interactive apparatus 10 on the support portion 34 so that the display screen 24 faces in direction F2 (see FIG. 6). This tilts the viewing angle of the display screen 24 so that the display screen 24 faces upwardly and forwardly towards a user's face. In particular, this is beneficial in improving the experience of the user using the interactive apparatus 10 on a floor, e.g. a child sitting on the floor and crouching over the interactive apparatus 10. The third mode of operation creates a more authentic play experience with the interactive apparatus 10 because the display screen 24 faces in the direction of the user's eyes. The interactive apparatus 10 may be operated to engage and process the media to produce outputs at the light source 16, speakers 18 and display screen 24 in a similar manner to that described above. In the third mode, due to the member 55 effectively causing the peripheral section 57 to be spaced apart from the surface S, when the light source 16 is operated, a footprint of light illuminates the surface S circumferentially around the support portion 34.

The user may place the interactive apparatus 10 into its second mode of operation by standing the interactive apparatus 10 on the front face 26 (see FIG. 5). This causes the sensor 25 to detect the changed orientation of the apparatus 10. For example, where sensor 25 is a light sensor 25, the sensor senses that the ambient light at the front face 26 is below the pre-determined level and the control device 22 accordingly dims or turns off the display screen 24. Similarly, where one or more of a light sensor, accelerometer and tilt switch are utilised alone or in combination, these can be used to determine the change in orientation of the apparatus 10 for the control device 22 to accordingly dim or turn off the display screen 24. For example, a tilt switch may detect a change from the apparatus 10 being in the first mode to the second mode. In the second mode of operation, the rear face 28 forms the top of the interactive apparatus 10. When the light source 16 illuminates the rear face 28, it causes light to be projected in a generally upward direction from the interactive apparatus 10. In particular, the light is directed in two directions R3, R4 which are angled to the left and right respectively as shown in FIG. 5. This creates a pleasing light effect which lights up the space immediately above the interactive apparatus 10 and any surfaces above the interactive apparatus 10, e.g. a ceiling or the like, onto which the light is incident. The user thus experiences a further play experience which can deepen the engagement with the media without the display screen 24 being utilised. For example, in the second mode, the media is outputted solely as sound and/or light without anything being displayed on the display screen 24.

The interactive apparatus 10 may be operated to engage and process the media in a similar manner to that described above except that outputs are produced by the light source 16 and speakers 18 whilst the control device 22 keeps the display screen 24 in a dimmed or off state.

In embodiments, the rear face 28 may include a further portion 52 which is differently shaped, e.g. it may extend vertically upwards from the upper end of the support portion 34 to a rear end of the top face 30. In embodiments, the rear face 28 may be configured so as to include a light source attached thereto for emitting light therefrom directly to the ambient environment without the rear face 28 including a translucent or transparent material or the like which is illuminated. Similarly, in embodiments, the light source may be configured differently and be mounted within the housing 14, e.g. on a rear facing surface of the PCB 42. In embodiments, the rear face 28 may be configured such that light is configured to pass through or from a portion thereof which is different from the support portion 34. In embodiments, the display screen 24 may incorporate the LEDs therein rather than the LEDs being mounted on the PCB 42. In embodiments, the display screen 24 may incorporate a different display technology.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. An interactive apparatus, the interactive apparatus including:
a housing including:
a light source that produces an ambient light effect in a surrounding environment;
a speaker;
a front face including a display screen;
a rear face opposite the front face and configured to permit light from the light source to pass therethrough or therefrom; and
a bottom face that is different than the front face and the rear face;
one or more input devices for providing one or more inputs; and
a control device for controlling the interactive apparatus, wherein the control device is configured for receiving media and controlling one or more of: the light source, the speaker, and the display screen to produce output in association with the media;
wherein the interactive apparatus, during use, is configured to be stood on a surface in:
a first mode, in which the interactive apparatus is operated, defined by the bottom face resting on the surface such that the front face including the display screen is directed in a first direction, and
a second mode, in which the interactive apparatus is operated, defined by the front face including the display screen resting on the surface, and for which the control device is configured to dim, or turn off, the display screen each time the interactive apparatus is placed in the second mode.

2. The interactive apparatus according to claim 1, wherein the rear face includes a support portion which extends rearwardly and upwardly away from the bottom face so that the interactive apparatus is configured, during use, to be stood on the surface in:
a further mode, which is different than the first mode and the second mode, in which the support portion rests on the surface such that the display screen is directed in a second direction which is inclined with respect to the first direction.

3. The interactive apparatus according to claim 1, wherein the control device is configured to dim the display screen each time the interactive apparatus is placed in the second mode.

4. An interactive apparatus, the interactive apparatus including:
a housing including:
a light source;
a speaker;
a front face including a display screen;
a bottom face that is different than the front face; and
a rear face opposite the front face, the rear face including a support portion which extends rearwardly and upwardly away from the bottom face so that the support portion is inclined with respect to the bottom face, and wherein the rear face is different than the bottom face and is configured to permit light from the light source to pass therethrough or therefrom;
one or more input devices for providing one or more inputs; and
a control device for controlling the interactive apparatus, wherein the control device is configured for receiving media and controlling one or more of: the light source, the speaker, and the display screen to produce output in association with the media,
wherein the interactive apparatus is configured, during use, to be stood on a surface in:
a first mode defined by the bottom face resting on the surface such that the front face including the display screen is directed in a first direction, and
a further mode, which is different than the first mode, defined by the support portion resting on the surface such that the front face including the display screen is directed in a second direction which is inclined with respect to the first direction.

5. The interactive apparatus according to claim 4, wherein the first direction is generally parallel to the surface.

6. The interactive apparatus according to claim 4 or 5, wherein the interactive apparatus is configured to be stood on the surface in:
a second mode, which is different than the first mode and the further mode, defined by the front face including the display screen resting on the surface, and for which the control device is configured to dim, or turn off, the display screen each time the interactive apparatus is placed in the second mode.

7. The interactive apparatus according to claim 6, including one or more sensors for detecting an orientation of the interactive apparatus for use by the control device in determining when the interactive apparatus is in the second mode, and the control device being configured to dim, or turn off, the display screen if the interactive apparatus is determined to be in the second mode based on the front face including the display screen resting on the surface.

8. The interactive apparatus according to claim 7, wherein the one or more sensors include one or more of a light sensor, accelerometer, or a tilt switch.

9. The interactive apparatus according to claim 6, wherein at least the support portion includes a raised part and a peripheral lower part that surrounds the raised part, such that, when the interactive apparatus is in the second mode, only the raised part of the support portion rests on the surface.

10. The interactive apparatus according to claim 9, wherein the rear face includes an opaque section and a translucent or transparent section; the translucent or transparent section extending around at least a periphery of the opaque section to permit the light to pass therethrough; and the translucent or transparent section forming a ring which extends around the opaque section.

11. The interactive apparatus according to claim 10, wherein the raised part includes the opaque section and the peripheral lower part includes the translucent or transparent section.

12. The interactive apparatus according to claim 11, wherein the opaque section extends across one or more of the support portion or further portion.

13. The interactive apparatus according to claim 6, wherein the control device is configured to dim the display screen each time the interactive apparatus is placed in the second mode.

14. The interactive apparatus according to claim 4 or 5, wherein the rear face is configured to permit the light from the light source to pass through or from the support portion.

15. The interactive apparatus according to claim 4 or 5, wherein the rear face includes a further portion connected to the support portion, and the further portion extends forwardly and upwardly away from the support portion.

16. The interactive apparatus according to claim 15, wherein the rear face is configured to permit the light from the light source to pass through or from the further portion.

17. The interactive apparatus according to claim 4 or 5, wherein the housing includes:
 a first housing part including the front face and the bottom face, and
 a second housing part, including the rear face, which is wedge-shaped.

18. The interactive apparatus according to claim 17, wherein the first housing part is cuboidal-shaped.

19. The interactive apparatus according to claim 4 or 5, wherein the interactive apparatus is a portable apparatus.

20. The interactive apparatus according to claim 4, wherein the one or more input devices include a reading device for reading a media identifier key present on a media object when said media object is placed into close proximity to or physical contact with the interactive apparatus.

21. The interactive apparatus according to claim 20, wherein the control device is configured to use the media identifier key to obtain an associated media and provide said associated media to one or more of the display screen, the light source, or the speaker.

22. The interactive apparatus according to claim 21, wherein the associated media is stored on a computer readable medium of the interactive apparatus or is stored on a remote computer from which the associated media is downloadable.

\* \* \* \* \*